US005630938A

United States Patent [19]

Feller et al.

[11] Patent Number: 5,630,938

[45] Date of Patent: May 20, 1997

[54] EVERTABLE DRUM CENTRIFUGE FILTER

[75] Inventors: Johannes Feller, Tuntenhausen; Gunnar Grim, München; Bruno Hegnauer, Gauting, all of Germany

[73] Assignee: Krauss-Maffei AG, Munich, Germany

[21] Appl. No.: 680,715

[22] Filed: Jul. 11, 1996

[30] Foreign Application Priority Data

Jul. 13, 1995 [DE] Germany .......................... 195 25 567.4

[51] Int. Cl.$^6$ .............................. B04B 3/02; B04B 11/00; B01D 33/11

[52] U.S. Cl. ........................ 210/350; 210/370; 210/380.3; 210/405; 210/456; 494/25; 494/36; 494/38; 494/41

[58] Field of Search ..................................... 210/350, 370, 210/380.3, 405, 456, 232; 494/25, 36, 38, 41

[56] References Cited

U.S. PATENT DOCUMENTS

| | | |
|---|---|---|
| 2,360,455 | 10/1944 | Vilter . |
| 3,438,500 | 4/1969 | Pico . |
| 5,169,525 | 12/1992 | Gerteis . |
| 5,304,306 | 4/1994 | Gerteis . |
| 5,472,602 | 12/1995 | Feller . |

FOREIGN PATENT DOCUMENTS

| | | |
|---|---|---|
| 1073259 | 1/1960 | Germany . |
| 3219686 | 12/1983 | Germany . |
| 8325049 | 3/1985 | Germany . |
| 3430507 | 2/1986 | Germany . |
| 3507819 | 9/1986 | Germany . |
| 3740411 | 6/1989 | Germany . |
| 9204982 | 4/1992 | WIPO . |

*Primary Examiner*—Thomas M. Lithgow
*Attorney, Agent, or Firm*—Herbert Dubno; Andrew Wilford

[57] ABSTRACT

An evertable drum centrifuge has a housing extending along an axis, a hollow filter drum rotatable in the housing about the axis and having a front end wall formed with a fill opening centered on the axis, and a nonrotatable fill tube extending along the axis and having a back end. A fill head complementarily engageable in the fill opening is fitted in a closed position in the fill opening and a suspension to be filtered is introduced through the fill tube and fill opening into the drum. A bearing rotatably supports the fill head on the fill-tube back end and a static seal is engaged between the fill head and the fill opening. A pair of dynamic seals flank the bearing, define with the head and fill tube an annular compartment surrounding the fill tube, and each have a head ring fixed rotationally on the head and having a face, a fill-tube ring fixed rotationally on the fill tube and having a face axially engaging the face of the respective head ring, and a spring urging the faces of the respective fill-tube ring and head ring axially together. The compartment is pressurized with a fluid that is forced from the compartment between the faces of the dynamic seals.

14 Claims, 2 Drawing Sheets

EVERTABLE DRUM CENTRIFUGE FILTER

FIELD OF THE INVENTION

The present invention relates to a centrifuge filter. More particularly this invention concerns such a filter having an evertable filter medium.

BACKGROUND OF THE INVENTION

In commonly owned U.S. Pat. No. 5,472,602 a filter is disclosed having a housing extending along an axis and defining a back filtrate compartment and a front solids compartment spaced therefrom and a filter drum rotatable in the housing about the axis. The drum has a generally cylindrical and perforate outer wall centered on the axis, axially fixed in the filtrate compartment, and having an axially forwardly open front end. It also has an end wall extending transverse to the axis and displaceable axially between a closed position fitting in the front outer-wall end to form a closed interior therewith and an open position spaced axially forward of the outer wall and lying in the solids compartment. The end wall is formed at the axis with a central fill opening. Extension structure fixed on the end wall has an annular rim spaced axially backward from the end wall. An annular liner of a flexible foraminous filter medium has a front edge attached to the outer-wall end and a back edge attached to the extension-structure rim. An actuator can axially displace the end wall and extension structure between the closed and open positions and thereby displace the liner from a normal position inside the drum and extending backward from the front end to the rim to an everted position substantially outside the drum and extending forward in the solids compartment from the front end to the rim. A fill tube extending along the axis has a back end and carries an axially nondisplaceable fill head complementarily engageable in the fill opening and having an annular seal engageable with the fill tube. A bearing supports the fill head on the fill tube for rotation thereon about the axis and a guide supports the fill tube on the housing for movement axially thereof so that, when the end wall moves axially with the fill head engaged in the fill opening, the fill tube moves axially jointly with the end wall. A suspension is supplied through the fill tube and fill opening in the closed position of the end wall and normal position of the fill tube to the interior of the drum.

The fill head is sealed in the fill opening by a simple static seal, e.g. an O-ring. The fill tube is generally sealed with respect to the fill head by one or more dynamic seals. Gland-type seals are used in above-cited U.S. Pat. No. 5,472,602 as well as in German patent document 3,740,411 of Gerteis while other more complex dynamic seals are described in German patent documents 1,073,259 of Mayer, 3,219,686 of Schlieperskotter, and 3,507,819 of Sade as well as in German utility model 8,325,049 and European published patent application WO 92/04982 of Gerteis.

While such dynamic seals function very well, at least at low pressure, they are subject to some wear and, therefore, shed a small amount of particles with use. For most applications the contamination posed by these particles is insignificant, but when such a filter is applied to the production of pharmaceuticals it cannot be tolerated. Furthermore the known dynamic seals either do not work when there is a significant pressure differential across them or wear excessively with a big pressure differential, shedding even more wear particles. Thus putting a pressure head across the filter medium to increase the effectiveness of the filter only increases the wear problems and some times even creates a leak.

OBJECTS OF THE INVENTION

It is therefore an object of the present invention to provide an improved drum centrifuge.

Another object is the provision of such an improved drum centrifuge which overcomes the above-given disadvantages, that is whose dynamic seals can be counted on not to contaminate the solids recovered from the centrifuge.

SUMMARY OF THE INVENTION

An evertable drum centrifuge has according to the invention a housing extending along an axis, a hollow filter drum rotatable in the housing about the axis and having a front end wall formed with a fill opening centered on the axis, and a nonrotatable fill tube extending along the axis and having a back end. A fill head complementarily engageable in the fill opening is fitted in a closed position in the fill opening and a suspension to be filtered is introduced through the fill tube and fill opening into the drum. A bearing rotatably supports the fill head on the fill-tube back end and a static seal is engaged between the fill head and the fill opening. A pair of dynamic seals flank the bearing, define with the head and fill tube an annular compartment surrounding the fill tube, and each have a head ring fixed rotationally on the head and having a face, a fill-tube ring fixed rotationally on the fill tube and having a face axially engaging the face of the respective head ring, and a spring urging the faces of the respective fill-tube ring and head ring axially together. The compartment is pressurized with a fluid that is forced from the compartment between the faces of the dynamic seals.

Thus the two faces are held microscopically apart so that there is no friction and no particles are shed to contaminate the material being filtered. Pressurizing the compartment between the dynamic seals allows the pressure in the drum to be increased with no leakage problems.

The fill tube according to the invention includes an outer tube carrying the bearing and fill-tube rings and an inner tube connected to the suspension-supply means, defining with the outer tube an axially extending passage, and opening into the drum. The means for pressurizing extends through the passage. The compartment can open into the passage or a separate return line can be provided. When the fluid is circulated through the compartment it is also possible to flush it as the fluid circulates. Thus without taking the system apart it is possible to purge it of unwanted gases, liquids, and/or other unwanted substances. The capillary action of the seals normally requires gas-free operation. The circulating fluid can also be used to sterilize the joint, for instance by using very hot water.

According to the invention the means for pressurizing includes a pump having a high-pressure side and a low-pressure side, a conduit extending through the passage and having one end connected to one of the sides and an opposite end opening into the compartment. The other side of the pump is connected to the passage although it is possible as mentioned above to use a separate return line in the passage. Alternately the compartment has axially opposite ends one of which is connected to the conduit and the other of which opens into the passage. The pressure in the compartment is greater than a pressure in the drum so that leakage across the joint is impossible.

Each of the head rings in accordance with the invention has an inner face exposed in the compartment and the fluid is compatible with the suspension, for instance sterile water or alcohol. It is also possible to introduce a gas under pressure into the drum. A hole can be provided between the passage and the interior of the drum so that the fluid used to pressurize and flush the joint is actually processed by the filter. In this arrangement the hole acts as a restriction to maintain the pressure in the compartment. In fact the hole in this system normally acts as or is provided with a check valve. This is particularly useful when the fluid is a gas.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
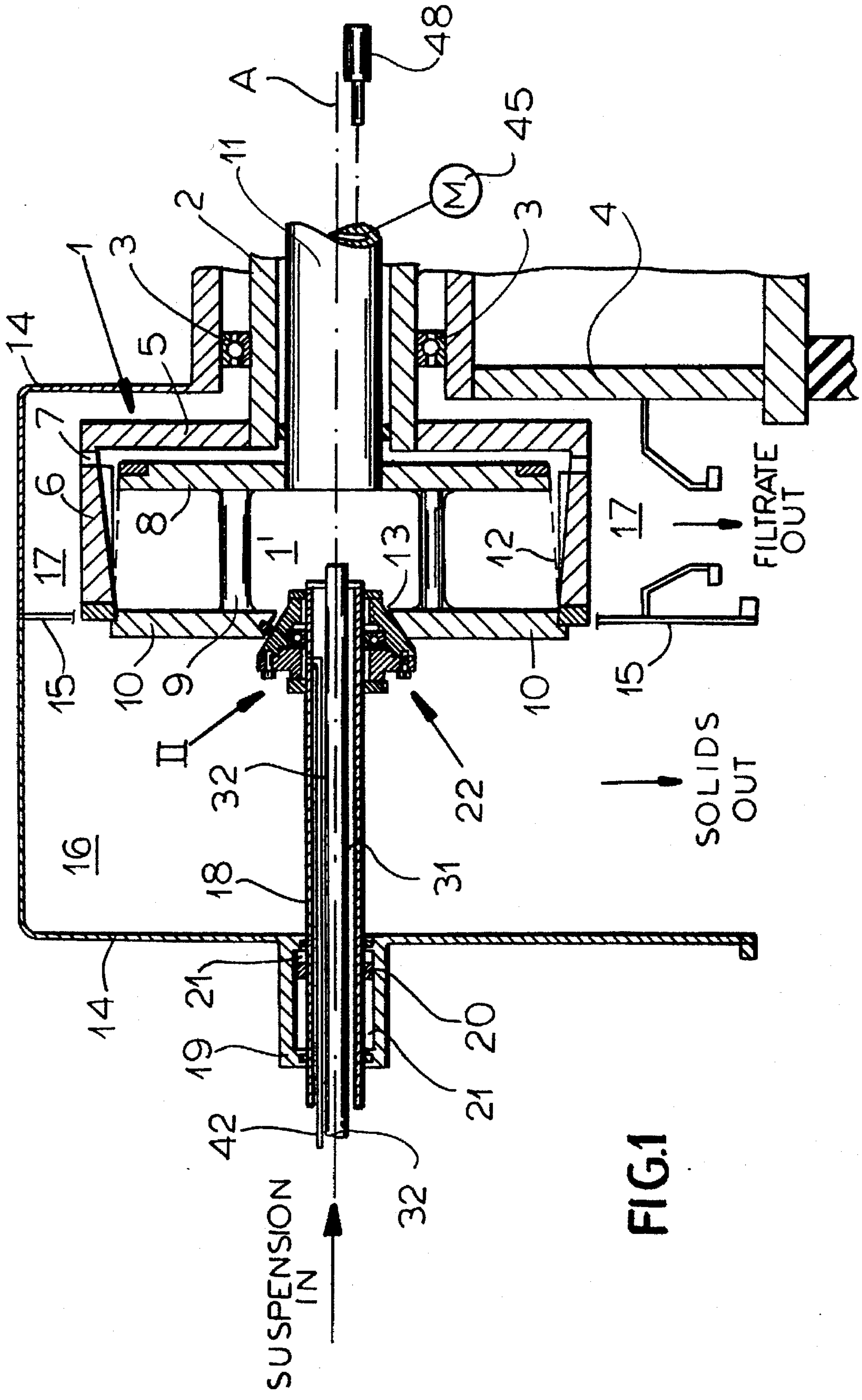
FIG. 1 is a partly diagrammatic axial section through the filter centrifuge according to the invention.
Figure 2:
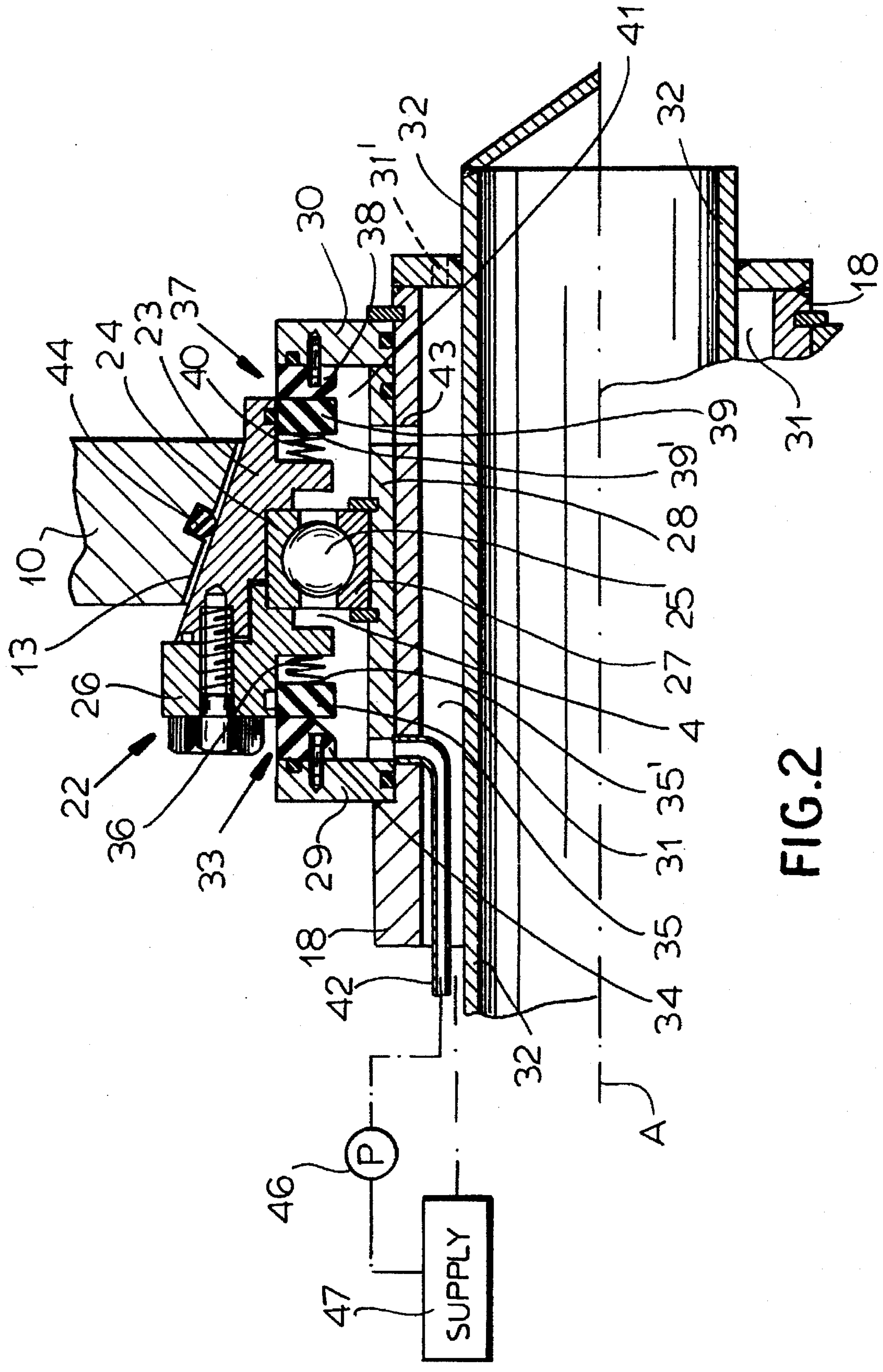
FIG. 2 is a larger-scale sectional view of the detail indicated at II in FIG. 1.

As seen in FIG. 1 an evertable centrifuge filter has a housing 4 in which is rotatable a drum 1 carried on a tube shaft 2 and having an axially displaceable circular end wall or plate 10 carried on a shaft 11 coaxially received in and rotationally coupled to the shaft 2. A fill tube 18 has a head 22 for supplying a suspension to be filtered to an interior 1' of the drum 1. The shaft 11 can be displaced axially by a schematically illustrated actuator 48 in the outer tube shaft 2 as described in more detail in above-cited U.S. Pat. No. 5,472,602. The housing 4 has a front end 14 subdivided by a partition 15 level with the front edge of the drum 1 into a rear filtrate compartment 17 and a front solids compartment 16.

The drum 1 has a planar back end wall 5 extending perpendicular to a drum axis A and a cylindrical side wall 6 with a forwardly (toward the left in FIG. 1) tapered inner surface and radially throughgoing perforations 7 at its rear edge. A mesh or cloth filter-medium liner 12 of basically cylindrically tubular shape has one end secured to the front edge of the side wall 6 and an opposite end secured to the outer edge of a circular support plate 8 spaced by struts 9 backward from the end plate 10, which itself can fit tightly as shown into the front end of the side wall 6 to close the drum 1. The end wall or plate 10 is formed centrally on the axis A of the drum 1 with a fill hole or opening 13 into which the head 22 fits.

The shafts 2 and 11 are coaxial about the axis A and are rotationally coupled together, for instance by a key or splines. The outer shaft 2 has a small-diameter front portion supported by roller bearings 3 in the housing 4 and supporting the shaft 11 by unillustrated seals and a drive motor indicated schematically at 45 serves to rotate the drum 1.

The shaft 18 is centered on the axis A and is axially slidable in a cylinder-forming guide 19 of the housing 4. This tube 18 carries a piston 20 subdividing the cylinder/guide 19 into a normally pressurized front compartment 21 and a normally depressurized back compartment 21'. At its opposite rear end the tube 18 has the head 22 comprised of an outer ring 23 whose outer surface is frustoconically complementary to the inner surface of the fill opening 13 which is provided with an O-ring 44 engaging the ring 23. This ring 23 is carried on an outer race 24 of a bearing 25 that is clamped in place by an end ring 26 and whose inner race 27 is carried on a sleeve 28 fixed on the inner end of the tube shaft 19. The shaft 18 carries further end rings 29 and 30 that axially flank and retain the sleeve 28, and the tube 18 forms an annular chamber or passage 31 with a feed tube 32 through which the suspension to be filtered is fed into the chamber 1'.

The ring 29 is sealed with respect to the rotating head 22 by a seal assembly 33 comprised of an outer seal ring 34 fixed to the ring 29, an inner ring 35 carried on the end plate 26 of the head 22, and a spring 36 braced against an inner face 35' of the seal ring 35 and pushing it out against the ring 34. Similarly the ring 23 is sealed with respect to the rotating head 22 by a seal assembly 37 comprised of an outer seal ring 38 fixed to the ring 28, an inner ring 39 carried on the outer ring 23 of the head 22, and a spring 40 braced against an inner face 39' of the seal ring 39 and pushing it out against the ring 38.

The parts 23, 24, 26, 35, 39, and 40 are normally engaged in the rotating end plate 10 of the drum 1 to rotate jointly therewith about the axis A while the parts 27, 28, 29, 30, 34, and 38 are fixed on the nonrotating tube shaft 18. A chamber 41 is therefore formed between these rotating and nonrotating parts and the bearing 25 as well as the seal rings 34, 34, 38, and 39 are all exposed to this annular chamber that is inwardly delimited by the sleeve 28 of the shaft 18. A supply conduit 42 extends in the passage 31 to one axial end of this chamber 41 and the opposite end is vented through a port 43 into the passage 31. A pump 46 and supply 47 serve to pressurize the chamber 41 with a fluid which can recirculate to the supply 47 through the passage 31 or flow into the chamber 1' via a restricted port 31'.

FIG. 1 shows the normal use position of the apparatus. The motor 45 rotates the entire drum 1 at high speed about the axis A while a suspension is fed to the front (left-hand in FIG. 1) end of the tube 32. This suspension exits from the rear end of the tube 32 into the interior 1' of the drum 1 where it moves radially outward. The liquid of the suspension passes through the filter-medium lining 12 and the holes 7 to exit the machine via the compartment 17. Meanwhile a cake of solids will build up on the inner surface of the filter lining 12. During this process it is of course possible to pressurize the interior 1' of the drum 1 to increase the pressure differential across the filter medium 12.

When the filter cake has built up to the desired thickness, the infeed of suspension is stopped to dry it out. Once it is dry the drive 45 is stopped and the shaft 11 is pushed forward by the actuator 48, that is to the left in FIG. 1. Meanwhile the compartment 21 is pressurized sufficiently to hold the head 22 in the fill opening 13, but not enough to impede forward movement of the plate 10.

As the plate 10 moves forward the filter lining 12 is everted, that is turned inside out. The filter cake on its inner surface will naturally fall off as it is everted, dropping down in the solids compartment 16.

Once the filter cake has all fallen off the everted lining 12, the parts are moved back into the normal use position of FIG. 1.

We claim:

1. An evertable drum centrifuge comprising:

a housing extending along an axis;

a hollow filter drum rotatably mounted in the housing about the axis and having a front end wall formed with a fill opening centered on the axis;

an evertably mounted filter medium inside the filter drum;

a nonrotatable fill tube extending along the axis and having a back end;

a fill head complementarily engageable in the fill opening and fitted in a closed position in the fill opening;

means for introducing a suspension to be filtered through the fill tube and fill opening into the drum;

a bearing rotatably supporting the fill head on the fill-tube back end;

a static seal engageable between the fill head and the fill opening;

a pair of dynamic seals flanking the bearing, defining with the head and fill tube an annular compartment surrounding the fill tube, and each having a head ring fixed rotationally on the head and having a face, a fill-tube ring fixed rotationally on the fill tube and having a face axially engaging the face of the respective head ring, and a spring urging the faces of the respective fill-tube ring and head ring axially together; and means for pressurizing the compartment with a fluid and forcing the fluid from the compartment between the faces of the dynamic seals.

2. The evertable drum centrifuge defined in claim 1 wherein the fill tube includes an outer tube carrying the bearing and fill-tube rings and an inner tube connected to the suspension-supply means, defining with the outer tube an axially extending passage, and opening into the drum, the means for pressurizing extending through the passage.

3. The evertable drum centrifuge defined in claim 2 wherein the compartment opens into the passage.

4. The evertable drum centrifuge defined in claim 2 wherein the means for pressurizing includes:

pump means having a high-pressure side and a low-pressure side;

a conduit extending through the passage and having one end connected to one of the sides and an opposite end opening into the compartment, the other side being connected to the passage.

5. The evertable drum centrifuge defined in claim 4 wherein the compartment has axially opposite ends one of which is connected to the conduit and the other of which opens into the passage.

6. The evertable drum centrifuge defined in claim 2 wherein the pressure in the compartment is greater than a pressure in the drum.

7. The evertable drum centrifuge defined in claim 2 wherein each of the head rings has an inner face exposed in the compartment.

8. The evertable drum centrifuge defined in claim 2 wherein the fluid is compatible with the suspension.

9. The evertable drum centrifuge defined in claim 2, further comprising means for introducing a gas under pressure into the drum.

10. The evertable drum centrifuge defined in claim 9 wherein the means includes a hole between the passage and the interior of the drum.

11. The evertable drum centrifuge defined in claim 10 wherein the hole acts as a restriction.

12. The evertable drum centrifuge defined in claim 11 wherein the hole acts as a check valve.

13. The evertable drum centrifuge defined in claim 2 wherein the fluid is a gas and a restriction is provided between the compartment and the drum.

14. The evertable drum centrifuge defined in claim 13 wherein the restriction acts as a check valve.

* * * * *